United States Patent [19]

Sieprath et al.

[11] Patent Number: 5,461,384
[45] Date of Patent: Oct. 24, 1995

[54] METHOD FOR MONTIORING AN AREA

[75] Inventors: Ing. W. Sieprath, Neu-Ulm; David Robinson, Ulm, both of Germany

[73] Assignee: Deutsche Aerospace AG, Munich, Germany

[21] Appl. No.: 175,345

[22] Filed: Jan. 5, 1994

[30] Foreign Application Priority Data

May 18, 1992 [DE] Germany ............................ 42 16 391.9

[51] Int. Cl.⁶ ..................................................... G01S 13/00
[52] U.S. Cl. .............................. 342/36; 342/27; 342/107; 342/146; 342/147
[58] Field of Search ................................... 342/28, 27, 36, 342/76, 118, 139, 146, 147, 104, 107

[56] References Cited

FOREIGN PATENT DOCUMENTS

| 0335558A2 | 10/1989 | European Pat. Off. . |
| 0466239A1 | 1/1992 | European Pat. Off. . |
| 2165414 | 4/1986 | United Kingdom . |

Primary Examiner—J. Woodrow Eldred
Attorney, Agent, or Firm—Spencer, Frank & Schneider

[57] ABSTRACT

The invention relates to a method for monitoring an area by a plurality of economical radar systems. These systems operate with CW modulation at low transmission power and can therefore be fully realized in semiconductor technology. The area is divided into base cells that are directly contiguous without gaps.

8 Claims, 9 Drawing Sheets

1=0.820
2=0.830
3=0.840
4=0.850

1=0.950
2=0.900
3=0.850
4=0.800
5=0.750
6=0.700
7=0.650
8=0.600

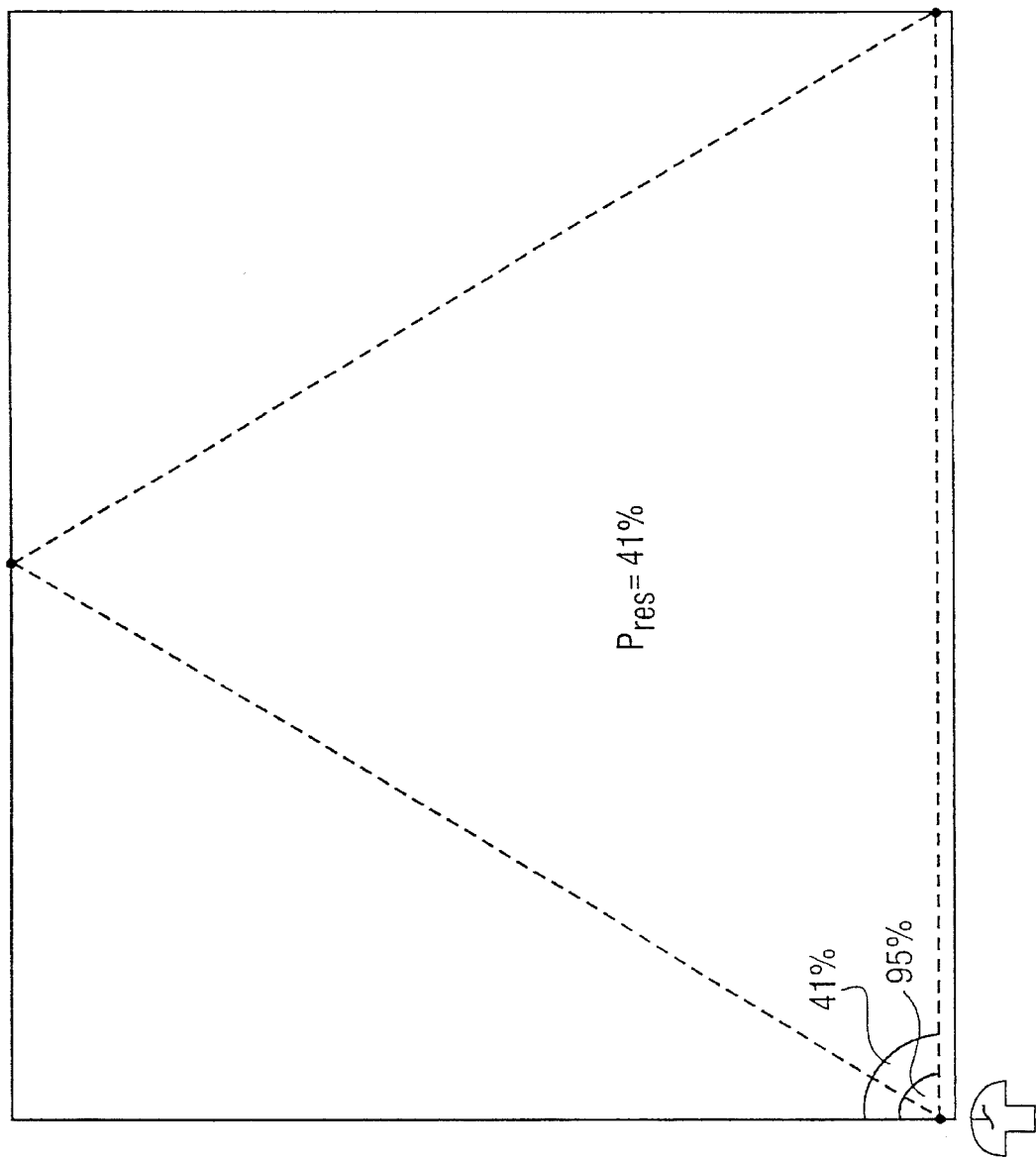

1 = 65%
2 = 55%
3 = 45%

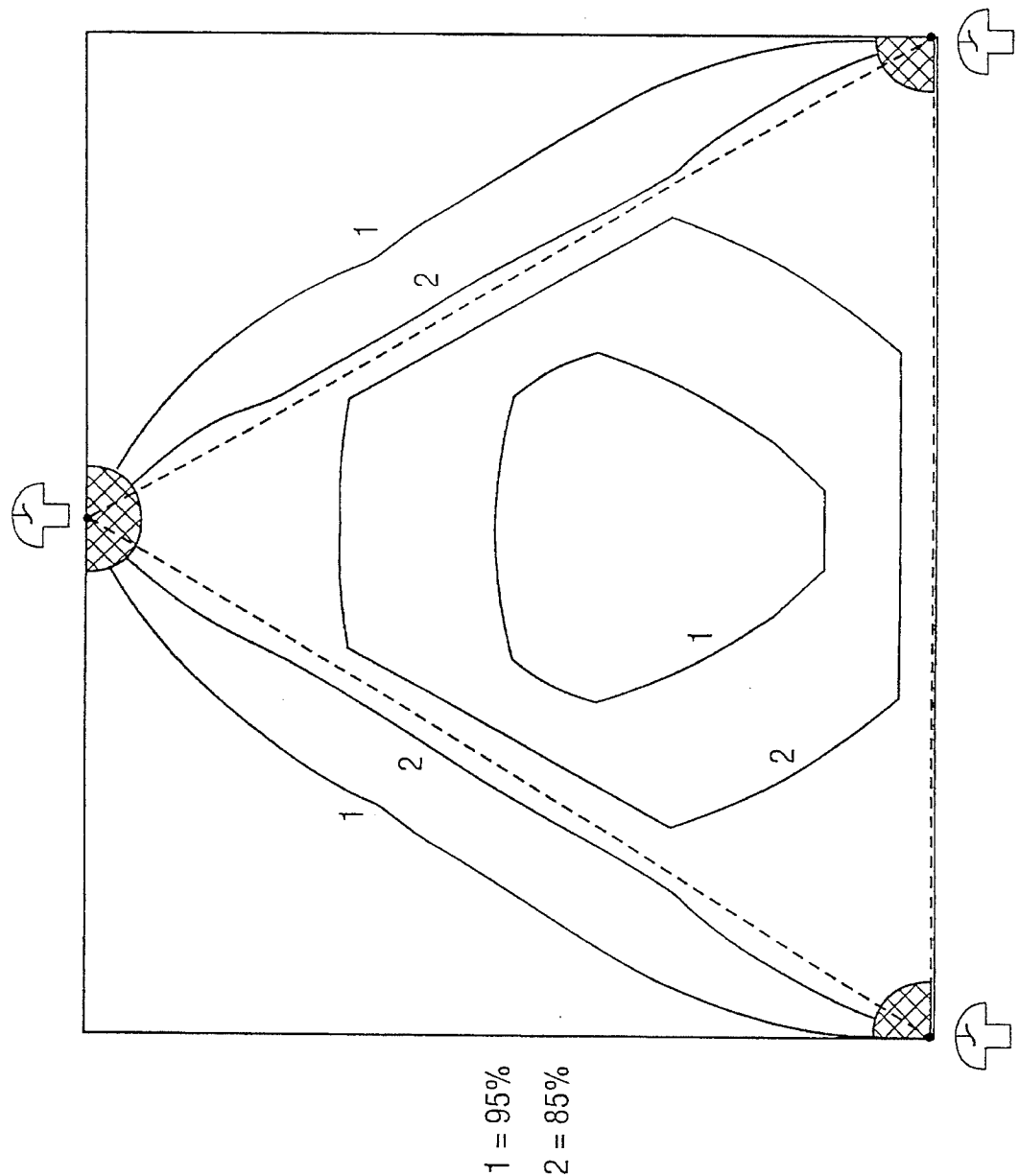

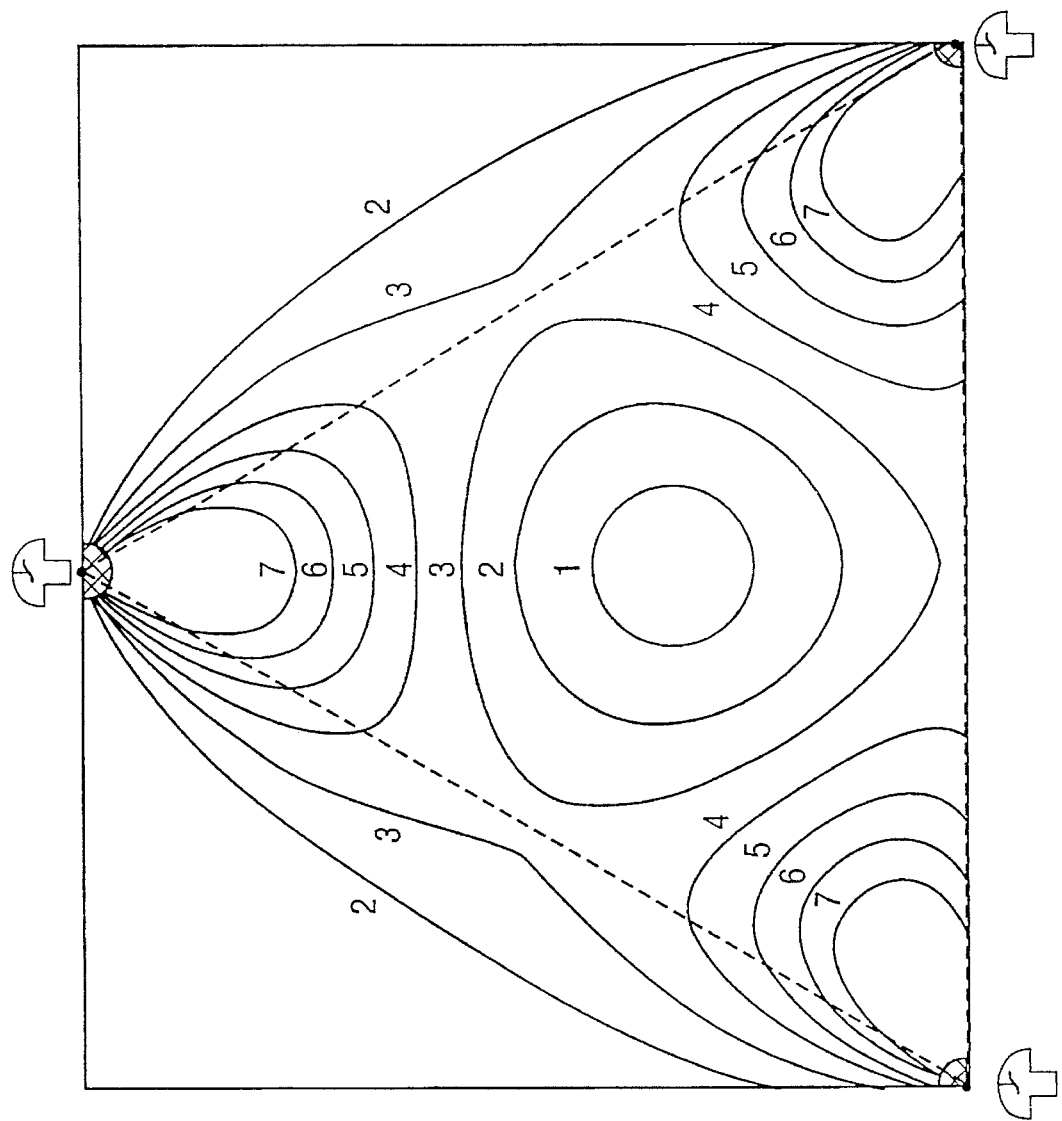

1=0.950
2=0.900
3=0.850
4=0.800
5=0.750
6=0.700
7=0.650
8=0.600

METHOD FOR MONTIORING AN AREA

BACKGROUND OF THE INVENTION

1. Field of the Invention

The invention relates to a method for monitoring an area, with the aid of a radar system.

The invention particularly relates to monitoring an area in which at least one non-cooperative radar target is present. A target of this nature has no so-called transponder and/or no navigation system whose navigation results can be interrogated by a stationary (radar) transmitter/receiver system.

2. Description of the Related Art

An area monitored by the present invention may be, for example, a regional airport at which aircraft are dispatched in accordance with visual flight rules. The area may also be a tarmac that is part of a major airport, for example, at which, in addition to immobile or moving aircraft, for instance, immobile or moving vehicles, for example shuttle buses and/or supply vehicles must be monitored. Moreover, the area may also be, for example, a navigable waterway, such as a river and/or a canal or a port.

Widely-varying types of radar targets are present in such areas whose position must be located and which must be classified as precisely as possible.

It is conventional to monitor such an area with the aid of a single, powerful radar system. If the area to be monitored has an unfavorable topography, a method of this type has the particular disadvantage that so-called shadows may develop, in which reliable monitoring is not possible.

SUMMARY OF THE INVENTION

Therefore, an object of the invention is to disclose a generic method that permits gap-free, low-distortion, precise localization, classification and tracking of stationary and/or moving objects or targets, as independently as possible of the target location, in the area to be monitored. Another object of the invention is to disclose an economical and reliable method.

A first advantage of the invention is that, in an area to be monitored, uniformly precise and improved localization and classification become possible with an array of high-resolution, economical and compact radar sensors of limited range.

A second advantage is that an arrangement of the radar systems and/or radar sensors is adapted to the area to be monitored (terrain), and hence gap- and shadow-free monitoring, become possible.

A third advantage is that economical limited-range semiconductor transmitters may be used for radar systems or radar sensors.

A fourth advantage is that the area to be monitored is divided into small planes, preferably contiguous triangles. In this way, an economical expansion of the area to be monitored is possible on the one hand, and on the other hand, sufficient monitoring is possible if one of the radar systems of radar sensors fails due to a defect or maintenance work.

BRIEF DESCRIPTION OF THE DRAWINGS

The invention can be more fully understood from the following detailed description of the invention in connection with the accompanying drawings which form a part of this application and in which:

FIG. 3B shows the resolution probability for an individual radar system for a double target in which the associated targets have a spacing of 2.5 m;

FIG. 3D shows the resolution probability for three radar systems of a triangular cell for a double target in which the associated targets have a spacing of 2.5 m;

FIG. 4A shows curves of the attainable precision for determining a velocity vector for a target within a triangularly-shaped cell.

Further advantages ensue from the following description.

DETAIL DESCRIPTION OF THE PREFERRED EMBODIMENTS

The invention is described in detail below by way of embodiments with reference to the schematically represented figures. FIGS. 1 through 4 show schematically represented diagrams for explaining the invention.

Figure 1:
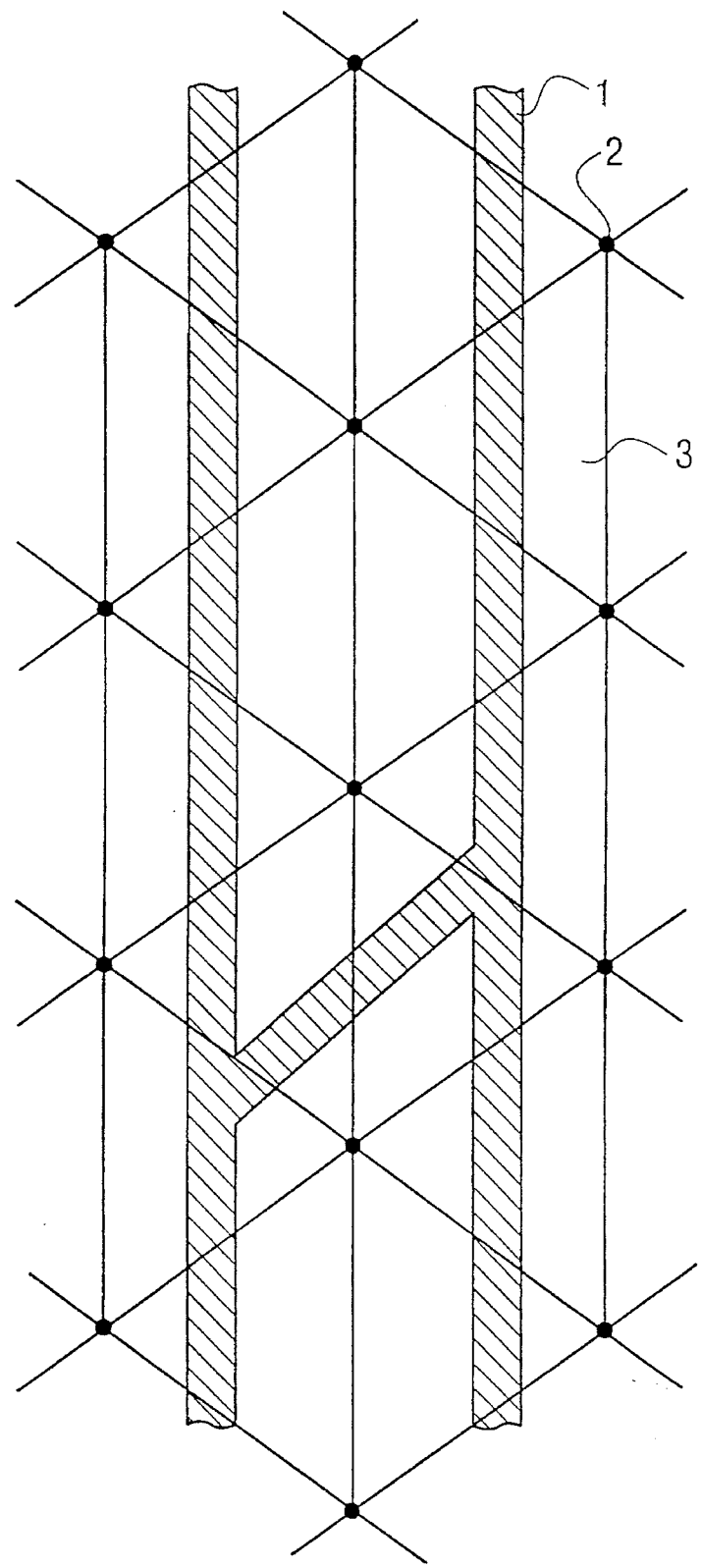
FIG. 1 shows an area to be monitored.

FIG. 1 shows the area 1 to be monitored in the form of two strips extending parallel and filled in with a gray dot pattern. The parallel strips are also connected by a diagonally extending strip. Such a representation may correspond, for example, to a partial area of an airport, such as a takeoff or landing strip segment to be monitored, or runways on the so-called tarmac. The representation may, however, also correspond to a canal or motor road system to be monitored that is located on topographically irregular terrain. For example, the representation may correspond to a canal or road system between which a hilly area and/or dense development is located.

An area of this type to be monitored is now superimposed in the way shown with a dot pattern (large, black dots). These dots 2 are spaced within a range of preferably 3 km to 3 km, depending on the existing topography. For better understanding, the dots 2 are connected by lines, so that gap-free, contiguous, polygonal areas 3 also called cells, result. These areas 3 are preferably embodied as triangles. Other areas or cells are also possible, however, for example squares, pentagons or hexagons and/or a combination of these. The corner dots belonging to an area 3 are selected to correspond to the topographical data such that from each dot the associated area or areas, for example, six areas for one dot located in the center of the dot pattern, gap-free and essentially shadow-free monitoring that is, without obstruction, is possible in accordance with optical visibility conditions during clear weather. Dots 2 may be located, for example, on a hill, a carrier pole, a building and/or, for example, directly adjacent to the takeoff/landing strip or the canal or road system to be monitored.

A radar system, also called a radar sensor, is disposed at each of the dots 2. A radar system of this type has a limited range that extends at most to the closest dot, which will be explained in more detail below. Such radar systems include, for instance, a transmitting/receiving antenna that rotates rapidly, for example at 60 rpm (revolutions per minute) and is configured as a reflector antenna with a maximum diameter of approximately 0.5 m. Such an antenna is advantageously protected by a radome. A CW mode (continuous wave operation) having a modulation adapted to it is preferably selected for the radar systems. The radar systems preferably operate within the MMW range (millimeter wave range) and preferably have a transmitting power within a range of 50 mW to 500 mW. Such transmitting systems can be produced economically in reliable semiconductor technology.

This plurality of radar systems is controlled and/or monitored from a central station that may be located at a great distance, for example several kilometers, from the area to be monitored. With a central station of this type, a plurality of such areas may also be simultaneously monitored in an economical manner. The necessary data communication between the central station and the individual radar systems takes place by way of suitable data communication lines, for instance electrical cables, fiber optics and/or radio links that likewise preferably operate in the millimeter wave range. The central station synchronizes, for example, the rotation of the radio antennas and/or the emitted millimeter waves in such a way that common signal processing of the signals received by the radar antennas can be realized inside an area 3. Also located in the central station is an evaluation unit that preferably includes a digitally operating computer system for the signals received from the radar systems. These signals may be evaluated in numerous ways, depending on the need. For example, it is possible to evaluate the signals received from an individual radar system and/or the radar systems associated with an area 3, and/or the radar systems associated with selected areas and/or all radar systems. In this way, for example, radar images can be displayed with varying spatial resolution.

FIGS. 2 through 4 show selected, advantageous detection properties for an area 3 configured as a triangular area. In this case the radar systems, shown in a mushroom shape, are located at the corner dots of a triangle which is also called the base cell.

Figure 2A:
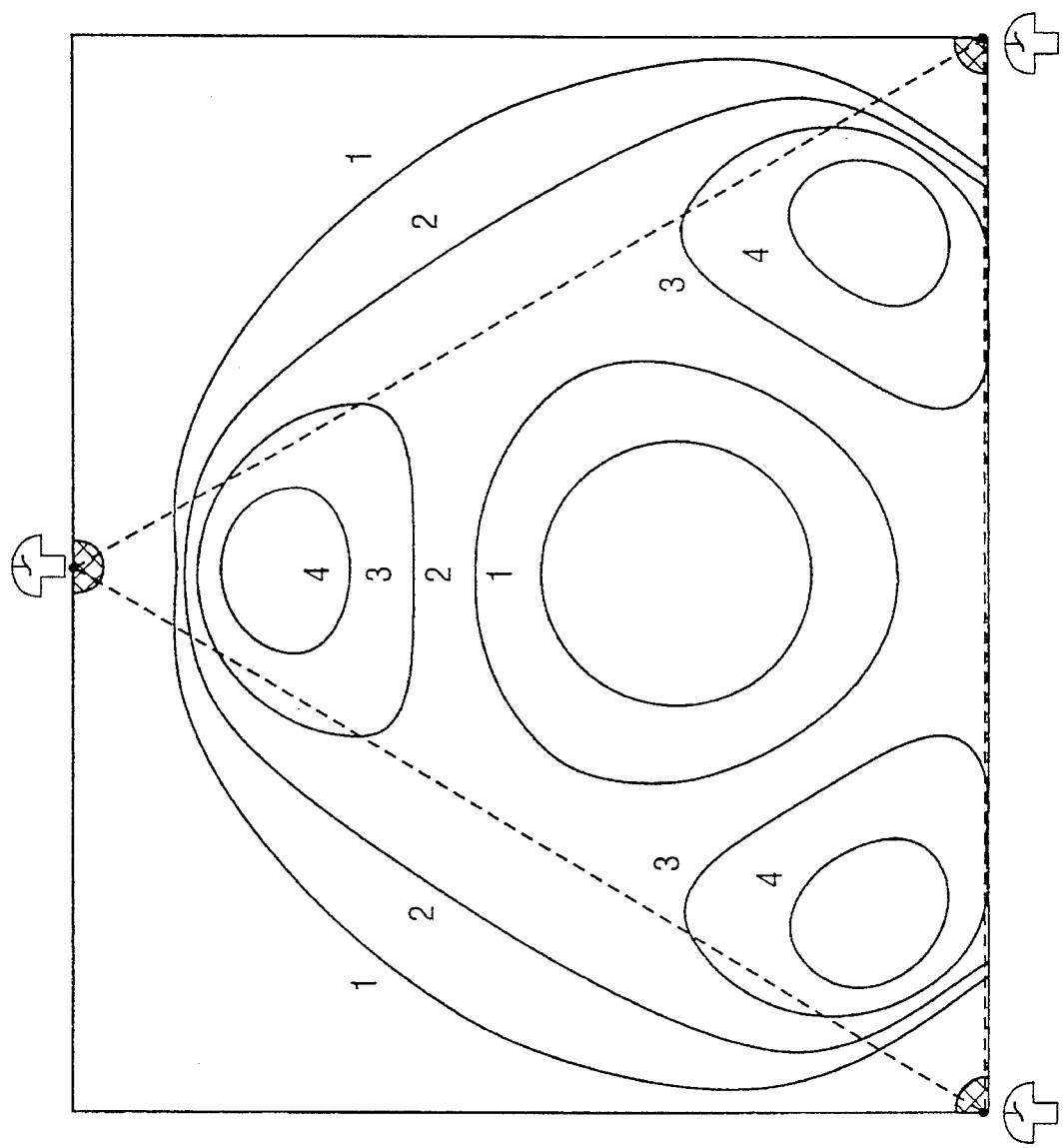
FIG. 2A shows curves of constant positioning precision for a moving or a non-moving target in a base cell according to the present invention.

In the region of the base cells, which are shown in dashed lines, FIG. 2a shows curves of constant positioning precision for a moving or non-moving target. Here the given, so-called CEP values (circular error probability) are normalized to the distance-measuring precision of the radar systems located at the corner dots. It can be seen that the positioning precision is advantageously nearly independent of location. The differences ensuing from curves 1 through 4 are negligible in practical application.

Figure 2B:
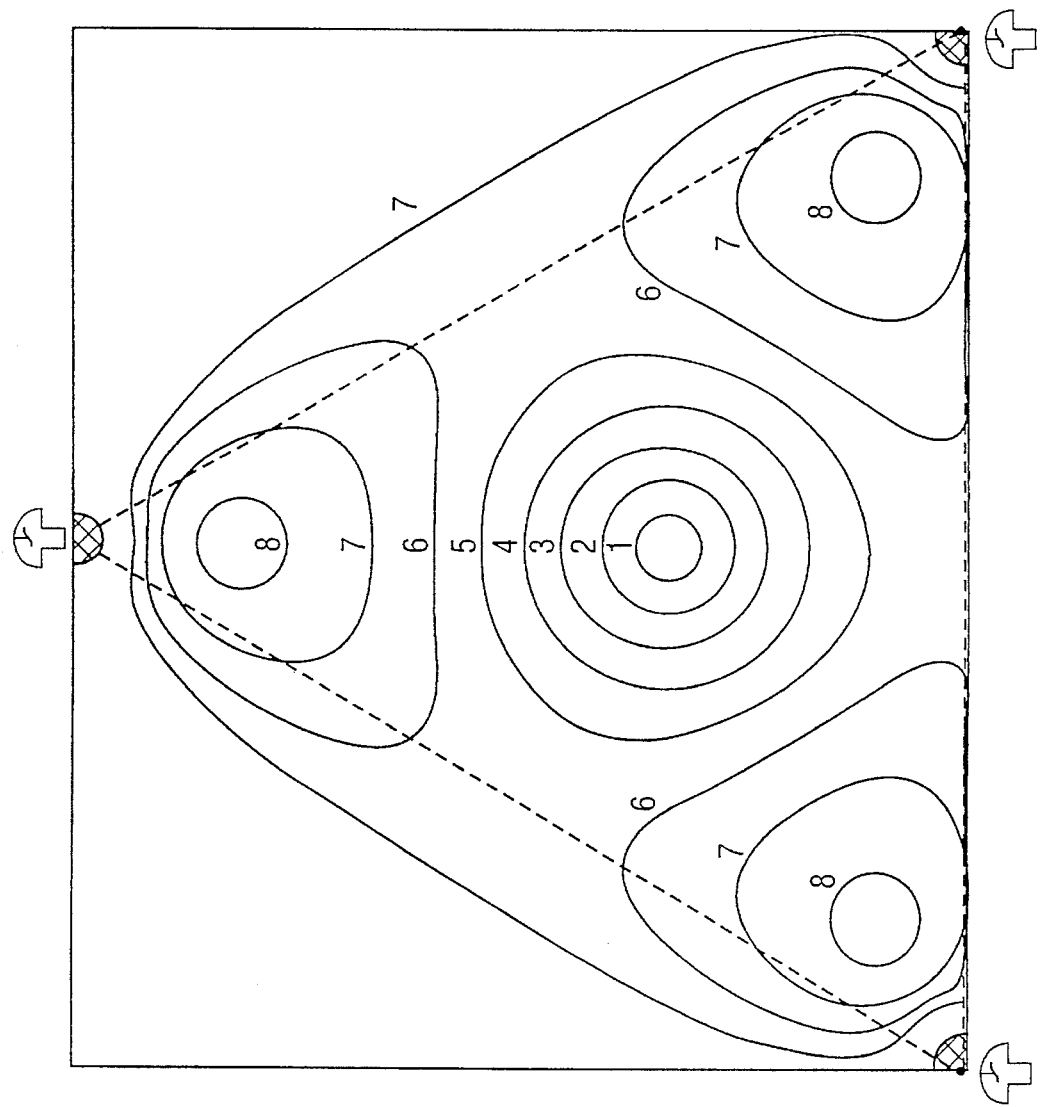
FIG. 2B shows curves of the ellipticity of the error ellipses corresponding to the curves of FIG. 2A.

FIG. 2b shows the ellipticity (axial ratio) of the error ellipses corresponding to the representation in FIG. 2a. It can be seen that a possibly imprecise localization of a target is only present directly adjacent (curve 8) to the radar systems.

Figure 3A:
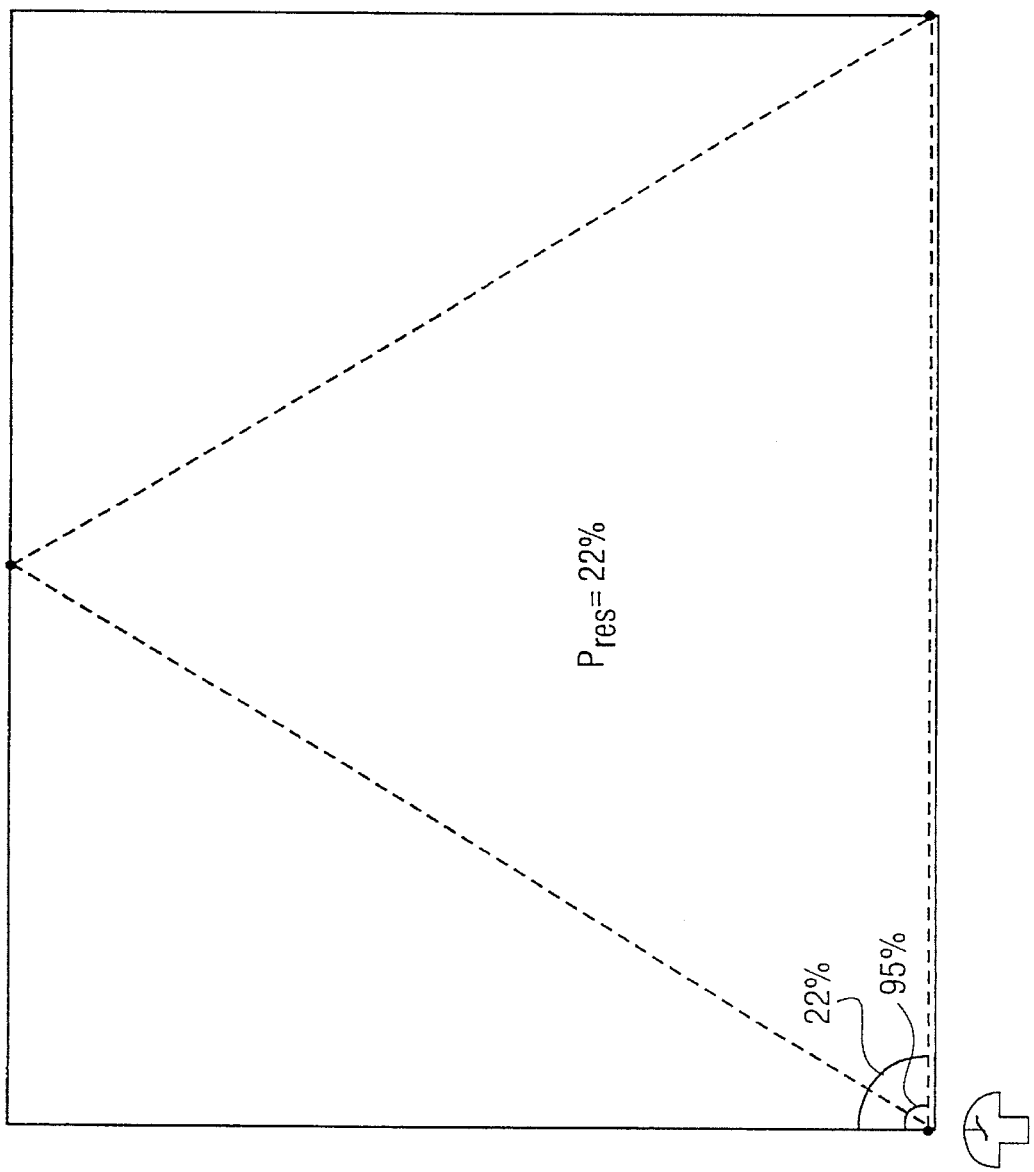
FIG. 3A shows the resolution probability for an individual radar system for a double target in which the associated targets have a spacing of 2.125 m.

FIGS. 3a, 3b show the resolution probability $P_{res}$ for an individual radar system. This system is located at the left corner dot of the base cell. At this location the spacings of the corner dots are approximately 1 km. The individual radar systems each have a range resolution of 2 m and an azimuth resolution of 2°. FIG. 3a shows that a double target in which the associated individual targets have a spacing d of only 2.125 m may be detected in nearly the entire base cell with a resolution probability of $P_{res}$=22%. A higher resolution probability is only present in the immediate vicinity of the radar system. FIG. 3b shows a representation that corresponds to FIG. 3a, but with the difference that the individual targets have a spacing of d=2.5 m. It can be seen that the resolution probability has increased to $P_{res}$=41% in the base cell.

Figure 3C:
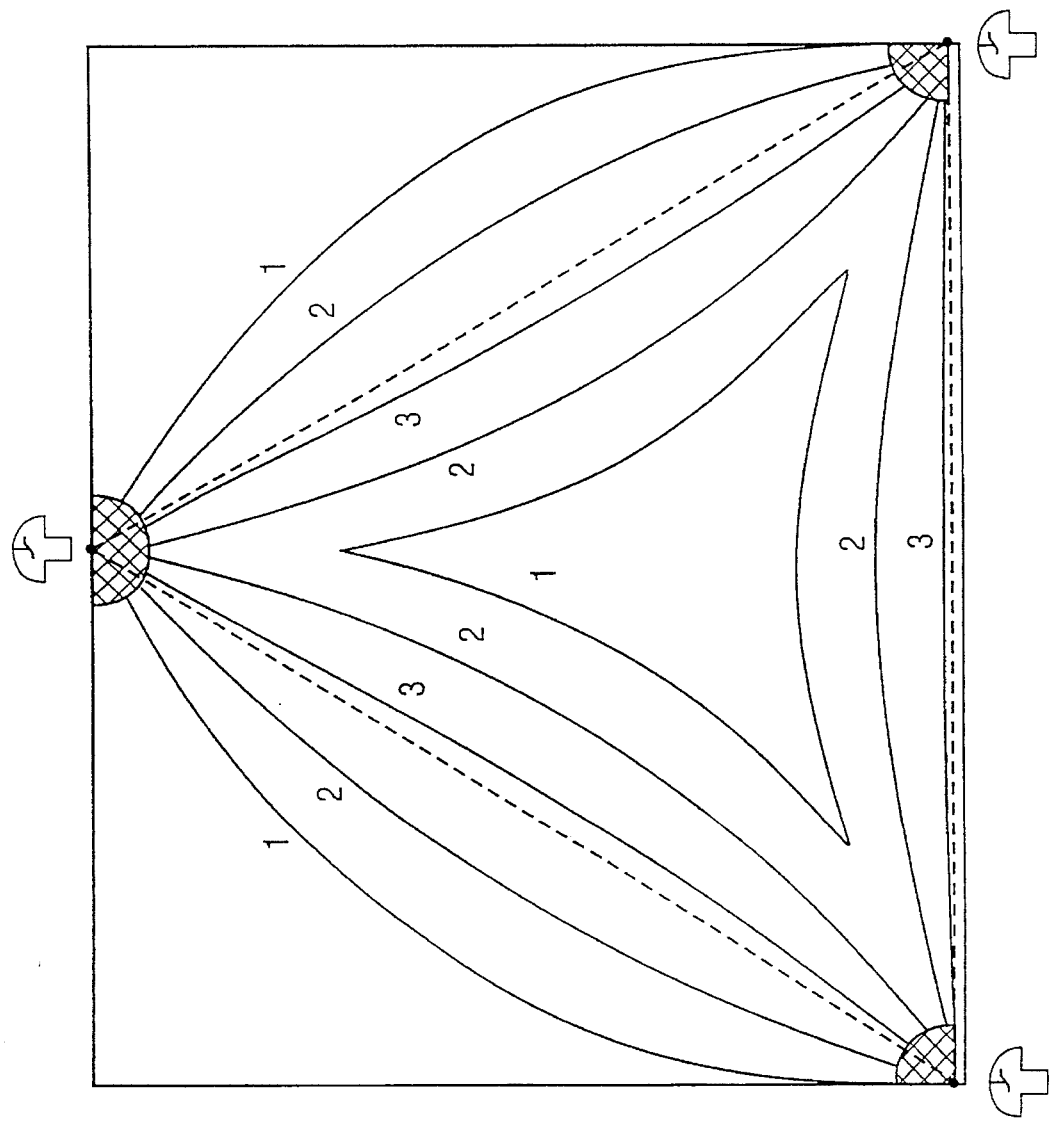
FIG. 3C shows the resolution probability for three radar systems of a triangular cell for a double target in which the associated targets have a spacing of 2.125 m.

FIG. 3c shows a representation that corresponds to FIG. 3a, but with the difference that a radar system corresponding to FIG. 3a is present at each corner dot. In the double target to be resolved, the individual targets have a spacing of d=2.125 m. It can be seen that now—in contrast to FIG. 3a—the resolution probability is $P_{res}$>50% in nearly the entire base cell, that is, the double target is resolved into the existing individual targets.

In the representation in accordance with FIG. 3d, the double target comprises two individual targets with a spacing of d=2.5 m. It can be seen that such a target—in contrast to FIG. 3b—may now be reliably resolved ($P_{res}$>80%).

Figure 4B:
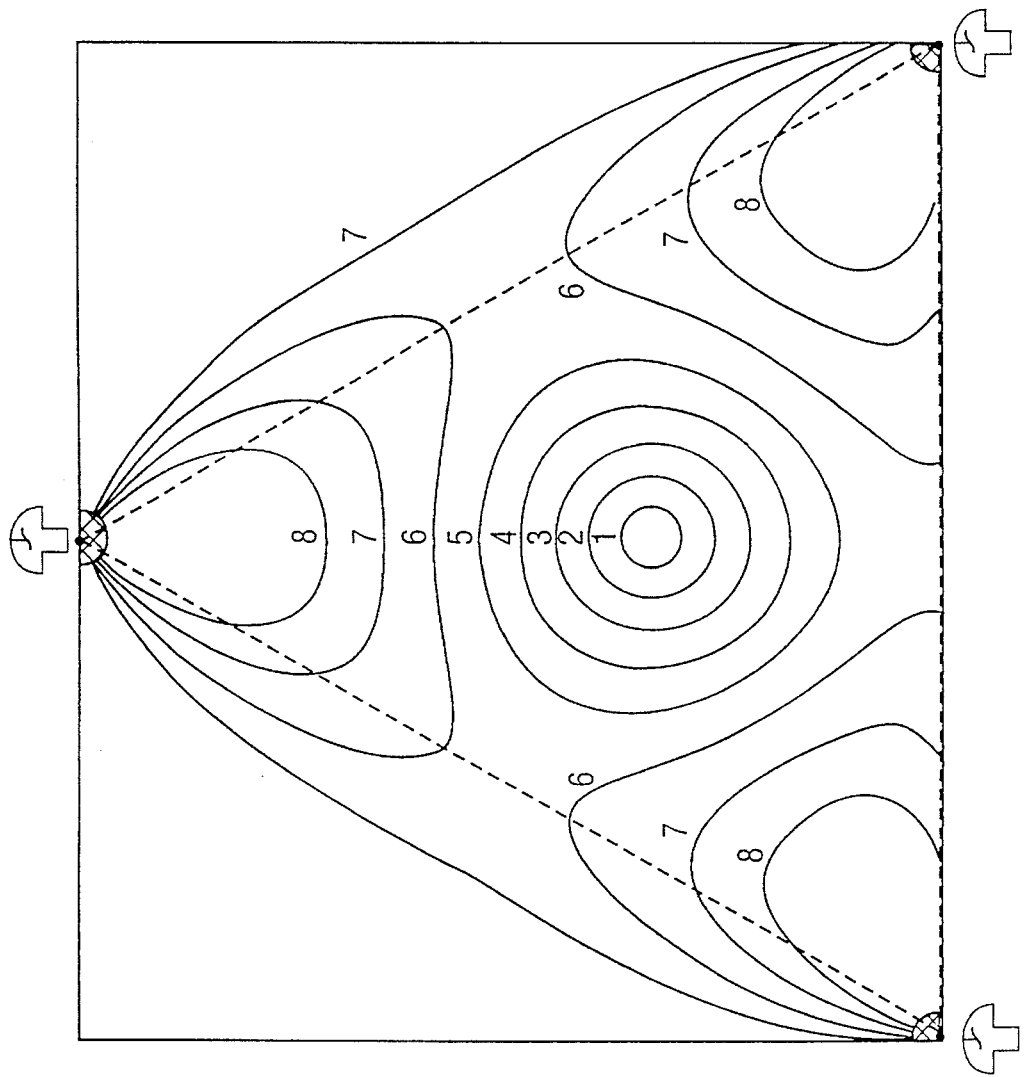
FIG. 4B shows the ellipticity of the error ellipses for the curves of FIG. 4A.

FIGS. 4a, 4b show the attainable precision in determining a velocity vector for a target within a base cell, corresponding to the representations in FIGS. 3c, 3d. FIG. 4a shows curves with a constant precision of the velocity vector in the region of the base cell. In this case the CEP data used are normalized to the Doppler measuring precision of the individual radar systems located at the corner dots. It can be seen that the velocity vector can be determined with a precision that is nearly constant inside the base cells.

FIG. 4b shows the ellipticity of the error ellipses of FIG. 4a.

The division described in FIG. 1 of the area to be monitored into preferably triangular base cells whose properties were represented by FIGS. 2 through 4 permits radar monitoring with further advantageous properties:

- A gap-free and low-distortion, that is, nearly distortion-free determination of the position and/or velocity of all cooperative and/or non-cooperative radar targets located in the area.
- A reliable classification of all targets, because targets are always observed from at least three different directions. In this way, targets can be distinguished that, for example, have identical or similar backscatter characteristics in a specific direction.
- The use of circularly polarized millimeter waves with polarimetric evaluation of orthogonal receiver channels. Because of this, interfering clutter, in particular caused by precipitation can be suppressed in a reliable manner.
- A radar map (clutter map) of the monitored area can be represented that is updated at predetermined time intervals.
- Detection and evaluation of the target attributes, such as geometrical structural features, expanse and polarization features of a target.
- Central tracking of one or a plurality of moving targets on the basis of position(s), velocity vectors and target attributes.
- Reliable predictions of possible collision conflicts among a plurality of traffic participants (moving targets).
- The area to be monitored can easily be expanded, for instance by lengthening a takeoff and/or landing strip of an airport without a decrease in the mentioned precision of position and/or velocity determination. In an expansion, merely a number of new base cells corresponding to the new area added needs to be added to an existing system of base cells.

A redundancy inherent to the system is present in the case of failure of individual radar systems. Then, for example, a triangular base cell becomes a hexagonal area in which the detection of targets continues to be possible, but possibly with reduced probability of detection. This type of property is also called "graceful degradation."

The invention is not limited to the described embodiments, but is applicable in numerous ways to others. For example, reliable monitoring of a national border is possible even if the topography is difficult, for example in the mountains. Moreover, reliable monitoring of ports, courses of rivers, bays and/or channels is possible.

We claim:

1. A method for monitoring an area with a radar system comprising the steps of:

superposing a dot pattern over the area to be monitored, the position of each dot being selected based on a topography of the area, at least three dots being configured as corner dots of an associated cell, and the spacing of the dots being selected based on detection characteristics required for the area;

disposing a radar system at each dot of the dot pattern, each radar system operating in a CW mode, and the operational properties of each radar system being selected based on the detection characteristics required for the area; and cross-linking at least the radar systems located at the corner dots of the area via an evaluation unit.

2. A method according to claim 1, wherein the position of the dots in the area is selected such that an optical visual connection exists between the dots, and that each cell associated with a dot can be monitored from the dot without obstruction.

3. A method according to claim 1, wherein at least two cells are disposed contiguous to one another without gaps and have a common boundary line;

at least one dot is configured as a corner dot of both cells, and the at least two cells are monitored by the radar system disposed at the corner dot of both cells.

4. A method according to claim 1, wherein the radar systems located at the dots each have a range that extends at most to an adjacent dot.

5. A method according to claim 1, wherein a selected range of a radar system is between 0.3 km to 3 km, and that the selected range is a function of a distance from dots which are adjacent.

6. A method according to claim 1, wherein the radar systems disposed at the corner dots of the associated cell emit a circularly polarized radiation in the millimeter wave range; and a polarimetric evaluation of orthogonal receiver channels is effected by the evaluation unit.

7. A method according to claim 1, wherein at least in every cell, signals received from the radar systems located at the corner dots associated with the cell are evaluated in the evaluation unit.

8. A method according to claim 1, wherein the evaluation unit determines at least a position and a vectorial velocity for a detected target, and the target is classified.

* * * * *